(12) United States Patent
Mani et al.

(10) Patent No.: US 7,526,412 B2
(45) Date of Patent: Apr. 28, 2009

(54) METHOD AND APPARATUS FOR MULTI-DISTANT WEIGHTED SCORING SYSTEM

(75) Inventors: Seshadri Mani, Surrey (CA); Mechthild Kellas-Dicks, Coquitlam (CA)

(73) Assignee: Biopassword, Inc., Issaquah, WA (US)

( * ) Notice: Subject to any disclaimer, the term of this patent is extended or adjusted under 35 U.S.C. 154(b) by 250 days.

(21) Appl. No.: 11/394,607

(22) Filed: Mar. 31, 2006

(65) Prior Publication Data

US 2007/0234056 A1    Oct. 4, 2007

(51) Int. Cl.
*G06F 15/00* (2006.01)
(52) U.S. Cl. ..................................... 702/194
(58) Field of Classification Search ................. 702/194; 713/186
See application file for complete search history.

(56) References Cited

U.S. PATENT DOCUMENTS

| | | | |
|---|---|---|---|
| 3,993,976 A | 11/1976 | Ginsburg | |
| 4,197,524 A | 4/1980 | Salem | |
| 4,455,588 A | 6/1984 | Mochida et al. | |
| 4,499,462 A | 2/1985 | Stoesser et al. | |
| 4,621,334 A | 11/1986 | Garcia | |
| 4,805,222 A | 2/1989 | Young et al. | |
| 5,060,263 A | 10/1991 | Bosen et al. | |
| 5,161,245 A | 11/1992 | Fenwick | |
| 5,181,238 A | 1/1993 | Medamana et al. | |
| 5,544,255 A | 8/1996 | Smithies et al. | |
| 5,557,686 A | 9/1996 | Brown et al. | |
| 5,675,497 A | 10/1997 | Petsche et al. | |
| 5,764,889 A | 6/1998 | Ault et al. | |
| 5,793,952 A | 8/1998 | Limsico | |
| 5,802,507 A | 9/1998 | Gentric et al. | |
| 5,910,989 A | 6/1999 | Naccache | |
| 5,930,804 A | 7/1999 | Yu et al. | |
| 6,062,474 A | 5/2000 | Kroll | |
| 6,151,593 A | 11/2000 | Cho et al. | |
| 6,167,439 A | 12/2000 | Levine et al. | |
| 6,307,955 B1 | 10/2001 | Zank et al. | |
| 6,334,121 B1 | 12/2001 | Primeaux et al. | |

(Continued)

FOREIGN PATENT DOCUMENTS

EP    1251468    10/2002

(Continued)

OTHER PUBLICATIONS

BioPassword, Inc., Office Action in U.S. Appl. No. 10/704,512, dated Dec. 11, 2007, 15 pages.

(Continued)

*Primary Examiner*—Bryan Bui
*Assistant Examiner*—Stephen J Cherry
(74) *Attorney, Agent, or Firm*—Blakely Sokoloff Taylor & Zafman LLP

(57) ABSTRACT

Methods of comparing a plurality of measurements to a template are described. Measurements are compared piecewise (element-by-element) and a proportion of successful comparisons at each of a plurality of distance scaling factors is calculated. The proportions are subjected to a nonlinear transformation, then normalized and combined into a weighted sum. The weighted sum is compared with a threshold value to establish the result of the comparison. Software and systems to implement embodiments of the invention are also described and claimed.

22 Claims, 5 Drawing Sheets

U.S. PATENT DOCUMENTS

| | | |
|---|---|---|
| 6,421,450 B2 | 7/2002 | Nakano |
| 6,513,018 B1 | 1/2003 | Culhane |
| 6,597,775 B2 | 7/2003 | Lawyer et al. |
| 6,839,682 B1 | 1/2005 | Blume et al. |
| 6,850,606 B2 | 2/2005 | Lawyer et al. |
| 6,865,566 B2 | 3/2005 | Serrano-Morales et al. |
| 6,944,604 B1 | 9/2005 | Majoor |
| 6,965,889 B2 | 11/2005 | Serrano-Morales et al. |
| 6,968,328 B1 | 11/2005 | Kintzer et al. |
| 6,993,514 B2 | 1/2006 | Majoor |
| 2004/0034788 A1 | 2/2004 | Ross |
| 2004/0103296 A1 | 5/2004 | Harp et al. |
| 2004/0162999 A1 | 8/2004 | Schreiber et al. |
| 2004/0187037 A1 | 9/2004 | Checco |
| 2005/0008148 A1 | 1/2005 | Jacobson |
| 2007/0245151 A1 | 10/2007 | Phoha et al. |

FOREIGN PATENT DOCUMENTS

| | | |
|---|---|---|
| JP | 11253426 | 9/1999 |
| JP | 11306351 | 11/1999 |

OTHER PUBLICATIONS

Biopassword, Inc., *PCT International Search Report* (dated Jun. 5, 2007), International Application No. PCT/US2006/048964—International Filing Date Dec. 20, 2006, 14 pages.

BioPassword Technical Report, BioPassword Keystroke Dynamics, Oct. 2001, pp. 1-9.

Bleha, S., et al., "Computer-Access Security Systems Using Keystroke Dynamics," IEEE Transactions on Pattern Analysis and Machine Intelligence (Dec. 1990), 12(12): 1217-1222.

Brown, M., et al., "User Identification via Keystroke Characteristics of Typed Names Using Neural Networks," Int. Journal of Man-Machine Studies (1993) 39(6): 99-1014.

Cotton, Ira W. et al, "Approaches to Controlling Personal Access to Computer Terminals," *Proceeding Computer Networks: Treads & Appos.*, 1975.

Fielding, R., et al., "Hypertext Transfer Protocol—HTTP 1.1", RFC2616 dated Jun. 1999; 177 pages.

Gaines, R. Stockton, et al., "Authentication by Keystroke Timing: Some Preliminary Results," Rand Co. R-2526-NSF, May 1980.

"Guidelines on Evaluation of Techniques for Automated Personal ID," U.S. Dept. of Comm./NBS, FIPS, PUB 48, Apr. 1977.

Jain, A.K., et al., "Artificial Neural Networks: A Tutorial," Computer, (Mar. 1996) 29(3): 31-44.

"Keystroke Dynamics Authentication of Computer Terminal Users," Bioaccess System 2000, 2000A, 2001, 2011, and OEM, Jun. 1984.

Kullback, Solomon, *Information Theory & Statistics*, John Wiley & Sons Inc., pp. 3383, 1959.

Legett, J., et al., "Verifying identity via keystroke characteristics," Int. Journal of Man-Machine Studies (1988) 28(1): 67-76.

Lippmann, R.P., et al., "An Introduction to Computing with Neural Nets," IEEE ASSP Magazine, (Apr. 1987) 4(2): 4-22.

Monrose, F., et al., "Authentication via Keystroke Dynamics," Proc. of the ACM Workshop, ACM Conference on Computer Communications Security (1997), pp. 48-56.

Monrose, F., et al., "Keystroke dynamics as a biometric for authentication," Future Generation Computer Systems, 16(2000): 359-359, Mar. 1999.

Rennick, R.J. et al., "Mufti-A Multi-Function ID System," *WESCON Tech. Papers*, 1975.

Riganati, John P., "An Overview of Electronic ID Systems," *WESCON Tech. Papers*, 1975.

Robinson, J.A., et al., "Computer User Verification Using Login String Keystroke Dynamics," IEEE Transactions on Systems, Man and Cybernetics—Part A: Systems and Humans, (Mar. 1998) vol. 28, No. 2, pp. 236-241.

Saltzer, Jerome H. et al., "The Protection of Information in Computer System," *Proceedings of the IEEE*, vol. 63, No. 9, Sep. 1975 (pp. 1278-1308).

Sedgwick, John, "The Body Code Machines: These New Computerized Devices Can Recognize You Anywhere," *This World*, Jan. 9, 1983, pp. 9-10.

Sheng, Y., et al., "A parallel decision tree-based method for user authentication based on keystroke patterns," IEEE Transactions on Systems, Man and Cybernetics—Part B: Cybernetics, (Aug. 2005) 35(4): 836-833.

Umphress, David et al., "Identity Verification Through Keyboard Characteristics," *Int. J. Man-Mach. St.*, pp. 263-273, 1985.

Biopassword, "Technical Report. BioPassword Keystroks Dynamics", http://web.archive.org/web/20040807231; http://www.biopassword.com/home/technology/BP%204.5%20Technical%20Paper.pdf, (Oct. 18, 2001).

Ilonen, J, "Keystroke dynamics", Advanced topics in information processing 1 - lectures, Lappeenranta University of Technology, Department of Information Technology, (2003), 1-15.

Monrose, F, et al., "Keystroke dynamics as a biometric for authentication", Future Generation Computer Systems, vol. 16, (2000), 351-359.

Peacock, A, et al., "Typing patterns: a key to user identification", IEEE Computer Society, vol. 2, No. 5, (Sep. 2004), 40-47.

Penn State Research Foundation, Inc., EP Extended Search Report dated Oct. 1, 2008 for EP Application No. 05858188.5.

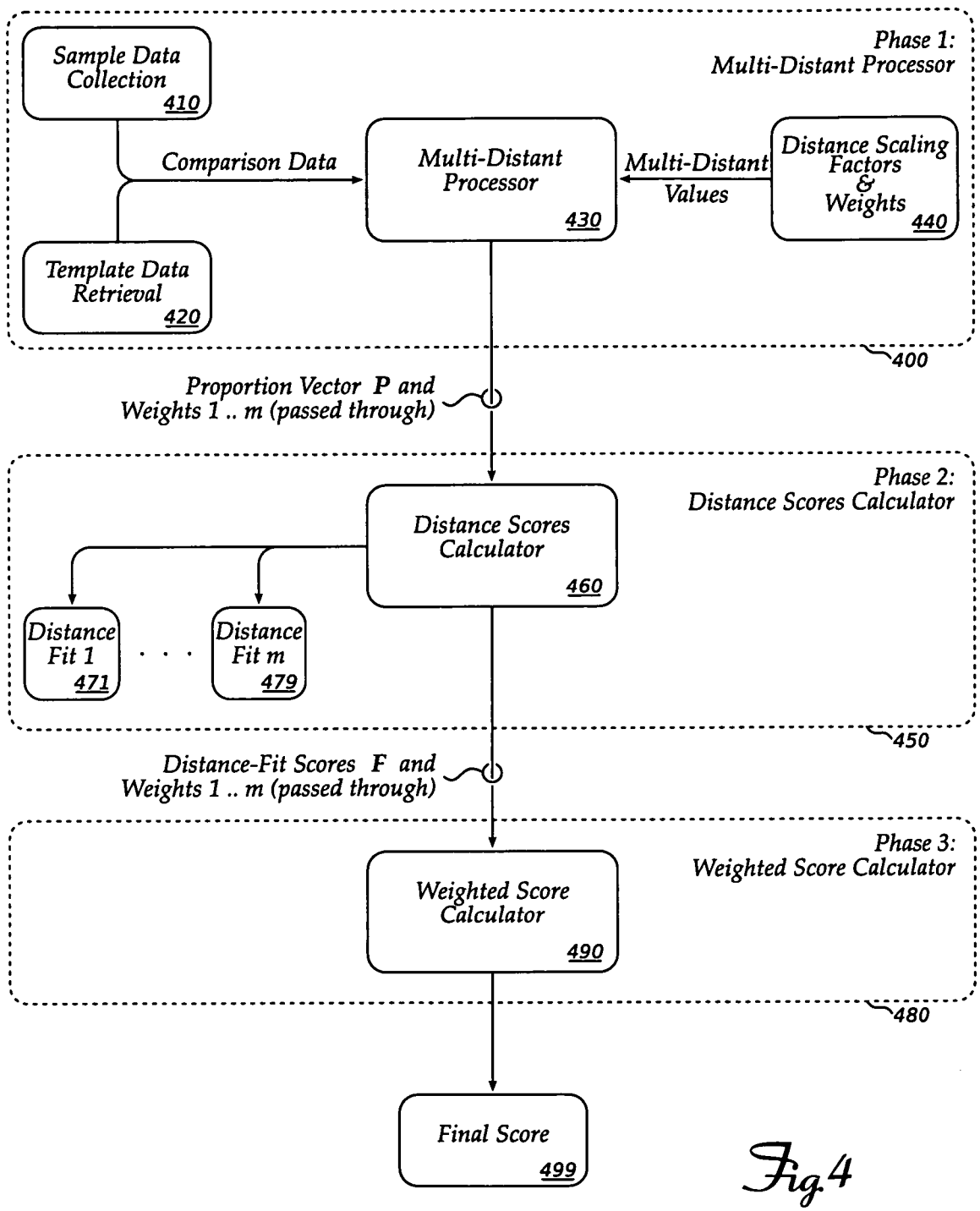

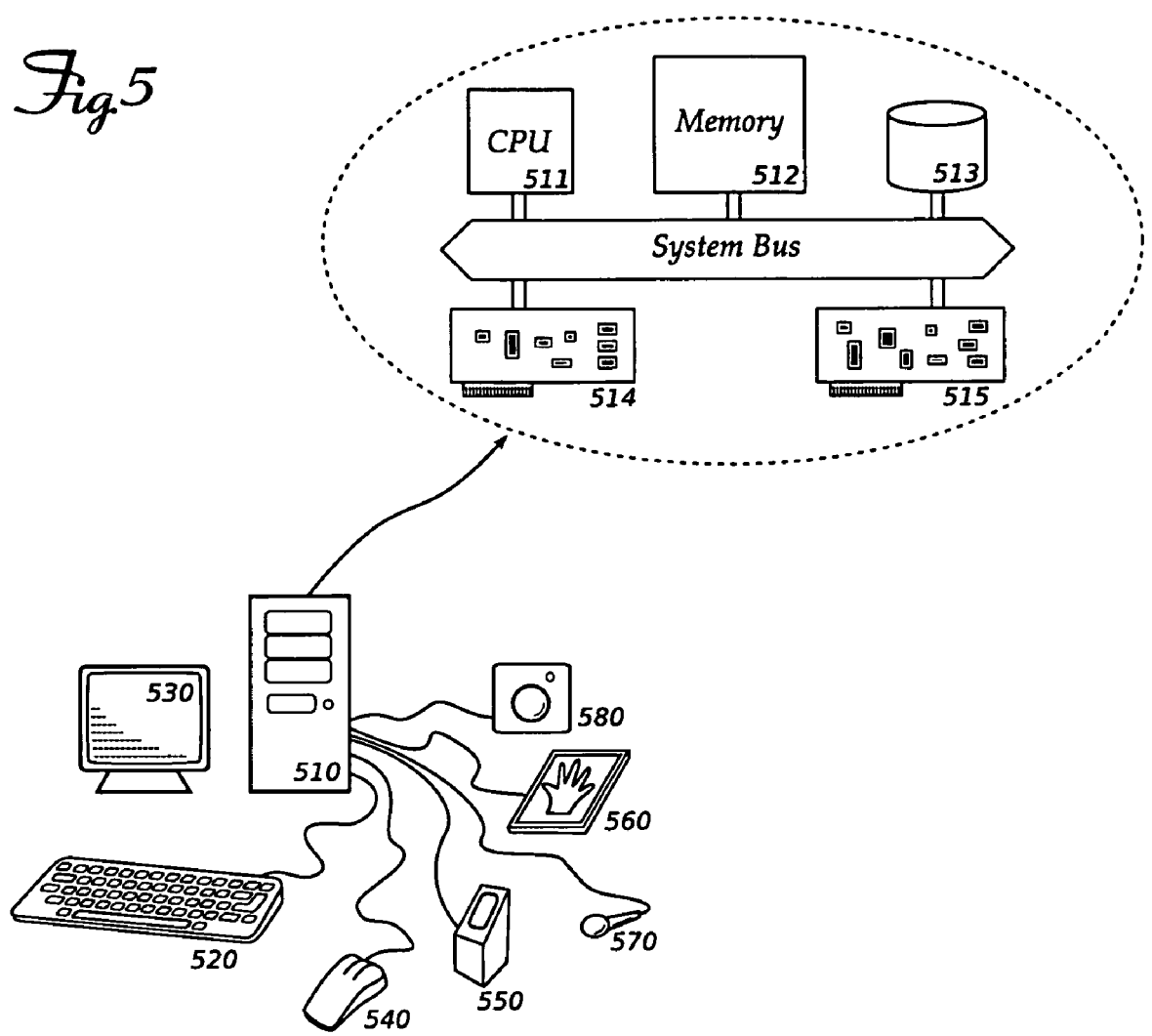

METHOD AND APPARATUS FOR MULTI-DISTANT WEIGHTED SCORING SYSTEM

FIELD

The invention relates to biometric data processing. More specifically, the invention relates to a method for scoring a biometric data sample against a template to determine whether the sample describes the same user as the template.

BACKGROUND

Computer systems often contain valuable and/or sensitive information, control access to such information, or play an integral role in securing physical locations and assets. The security of information, assets and locations is only as good as the weakest link in the security chain, so it is important that computers reliably be able to distinguish authorized personnel from impostors. In the past, computer security has largely depended on secret passwords. Unfortunately, users often choose passwords that are easy to guess or that are simple enough to determine via exhaustive search or other means. When passwords of greater complexity are assigned, users may find them hard to remember, so may write them down, thus creating a new, different security vulnerability.

Various approaches have been tried to improve the security of computer systems. For example, in "have something, know something" schemes, a prospective user must know a password (or other secret code) and have (or prove possession of) a physical token such as a key or an identification card. Such schemes usually provide better authentication than passwords alone, but an authorized user can still permit an unauthorized user to use the system simply by giving the token and the secret code to the unauthorized user.

Other authentication methods rely on measurements of unique physical characteristics ("biometrics") of users to identify authorized users. For example, fingerprints, voice patterns and retinal images have all been used with some success. However, these methods usually require special hardware to implement (e.g. fingerprint or retinal cameras; audio input facilities).

Techniques have been developed that permit computer users to be authenticated at machines without any special hardware. For example, U.S. patent application Ser. No. 4,805,222 to Young et al. describes verifying the identity of an individual based on timing data collected while he types on a keyboard. Identification is accomplished by a simple statistical method that treats the collected data as an n-dimensional vector and computes the distance between this vector and a target vector. More sophisticated analyses have also been proposed. For example, U.S. Pat. No. 6,151,593 to Cho et al. suggests using a neural network to classify keystroke timing vectors.

The problem of comparing a biometric sample to a template or reference sample to determine whether the samples describe the same person is a difficult one. Improved algorithms to validate biometric samples may be useful in producing more accurate identifications with reduced false acceptance rates ("FAR") and false reject rates ("FRR"). In any 'generic' comparison technique, using the natural behavior of the data to study the data is a proved methodology i.e. in case of behavioral biometrics the measurements are not repeatable and hence using the 'variance' nature of the data to study the data is a logical methodology.

SUMMARY

Embodiments of the invention perform pairwise comparisons between a sample and a template, determining for each sample element whether the element falls within an allowable variability range of the template. Binary (success/failure) comparison results are collected with several scaling factors applied to the allowable variability ranges, and proportions of success and failure are computed for each scaling factor. The proportions are transformed through a nonlinear function and the transformed proportions are normalized. Finally, the normalized values are weighted, and the result is the output of this system. Typically, this output is used to determine whether the sample refers to the same person as the template.

BRIEF DESCRIPTION OF DRAWINGS

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

FIG. 4 shows an alternate view of the architecture of an embodiment of the invention.

FIG. 5 shows some components of a computer system that can support an embodiment of the invention.

DETAILED DESCRIPTION

Figure 1:
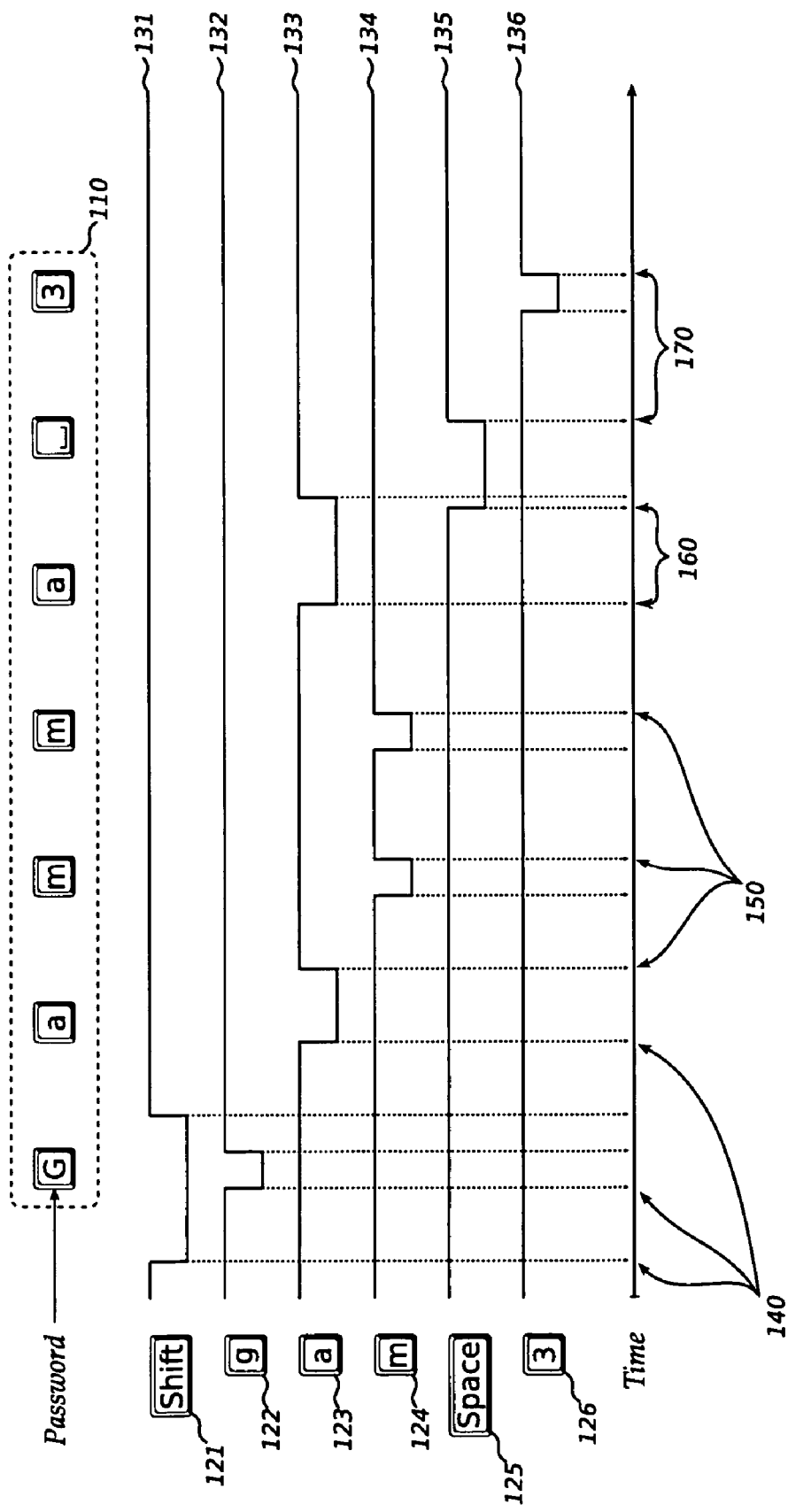
FIG. 1 shows one way of collecting biometric data of a user.

FIG. 1 represents one way of collecting biometric data of a user. The user is typing the password "Gamma 3" 110. The timeline shows the six keys 121-126 involved in typing the password, and to the right of the keys, six corresponding traces 131-136 indicating when the keys are pressed and released. The data collected may include key press times 140, key release times 150, times from a first key press to a subsequent key press 160, and times between key releases 170. Some embodiments may collect (or compute) key press durations, overlaps (pressing one key before releasing the previous key), or other similar metrics. (Durations and overlaps not indicated in this Figure.) Many different metrics can be measured directly or calculated from raw key press and key release times; some metrics may be easier to compute than to measure. Derived datasets can also be prepared and used with embodiments of the invention. For example, timings for pairs (or larger groups) of keystrokes can be collected or calculated and processed as described below. It is recognized in the art that these typing rhythm metrics vary from repetition to repetition and between typists.

Figure 2:
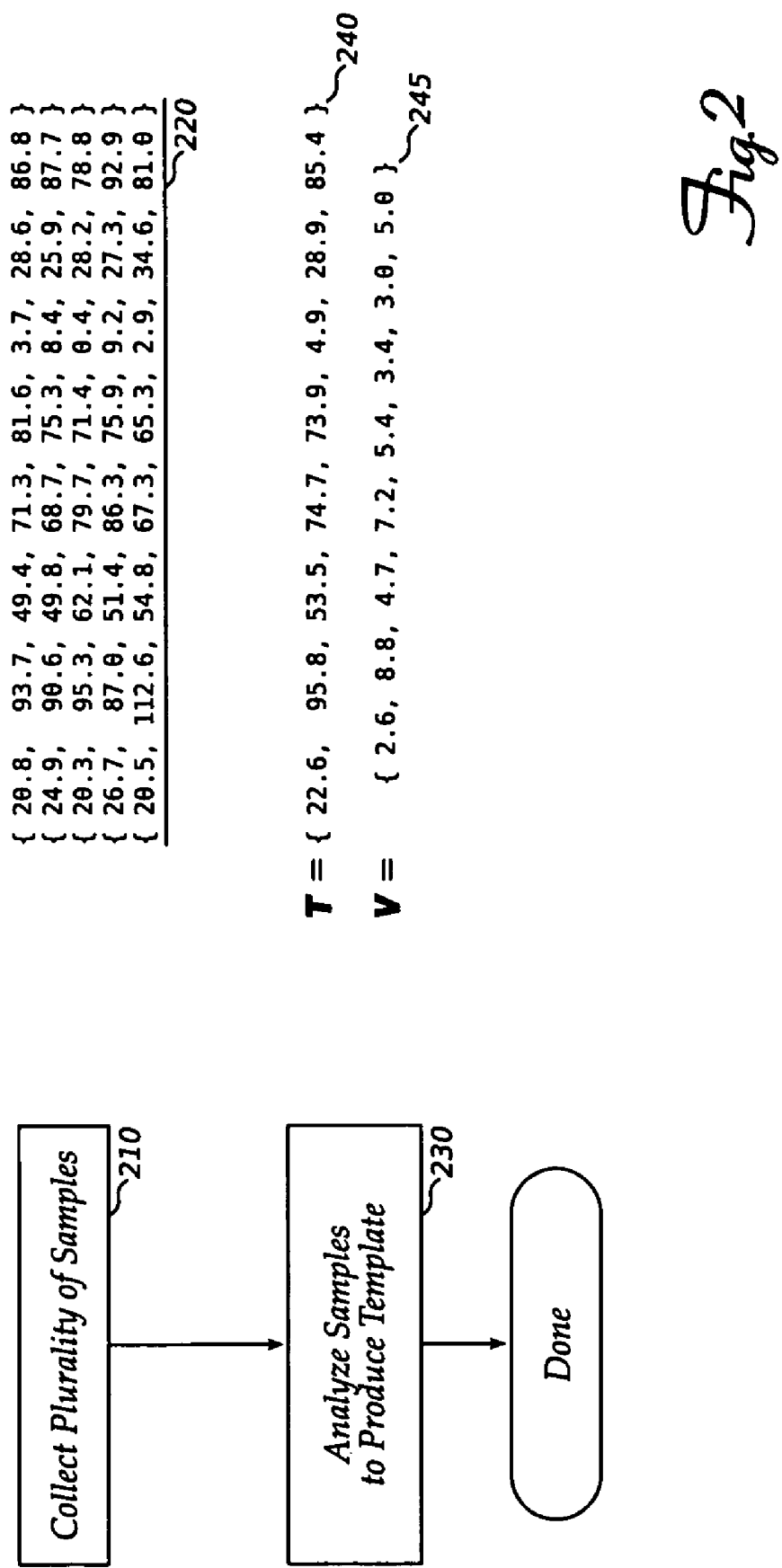
FIG. 2 outlines a process for preparing a template.

Collecting keystroke timing data as described above yields a vector of scalar quantities. Vectors are used first in an enrollment process to prepare a biometric template, and then later in a verification process according to an embodiment of the invention. FIG. 2 briefly outlines one possible method of preparing a biometric template.

First, a plurality of sample vectors are collected (210). This Figure shows five sample vectors 220. Note that the cardinality of each vector (the number of elements in the vector) is the same. These vectors contain only eight elements, but a typical key timing vector might contain dozens of elements. Also, it is appreciated that other data collection devices can produce vectors of numbers that describe biometric measurements. A simple example is a finger-length measuring device: it may produce five-element vectors where each element indicates the length of a finger. Finger length measurements are known to have some utility in distinguishing individuals. Fingerprint sensors, voice records, and iris images can also produce data that may be rearranged into vectors and used with embodiments of the invention.

Second, the collected samples are analyzed to produce a template (230). The template consists of a vector T 240 of equal cardinality as the samples, and an allowable variability vector V 245 that indicates how much the input samples can be varied from T. Note that in this example, T is simply the average of the input sample vectors, and V is the root mean square ("RMS") of the differences between the average and the input sample vectors. Other methods of selecting and processing input samples may produce a superior template, or permit the enrollment process to be completed more quickly.

It is appreciated that embodiments of the invention can operate with templates produced by any method, as well as with reference patterns produced from non-biometric data. In general, any application that involves comparing an input pattern to a reference pattern or template to derive a conclusion can make use of embodiments of this invention. For example, a collection of credit data (credit extensions, payment histories, and similar information) can be processed to produce a template that describes a favorable credit risk or a "good borrower." Then, the template can be compared with credit information from a potential customer to decide whether extending a loan to the customer is likely to be a wise business decision.

Figure 3:
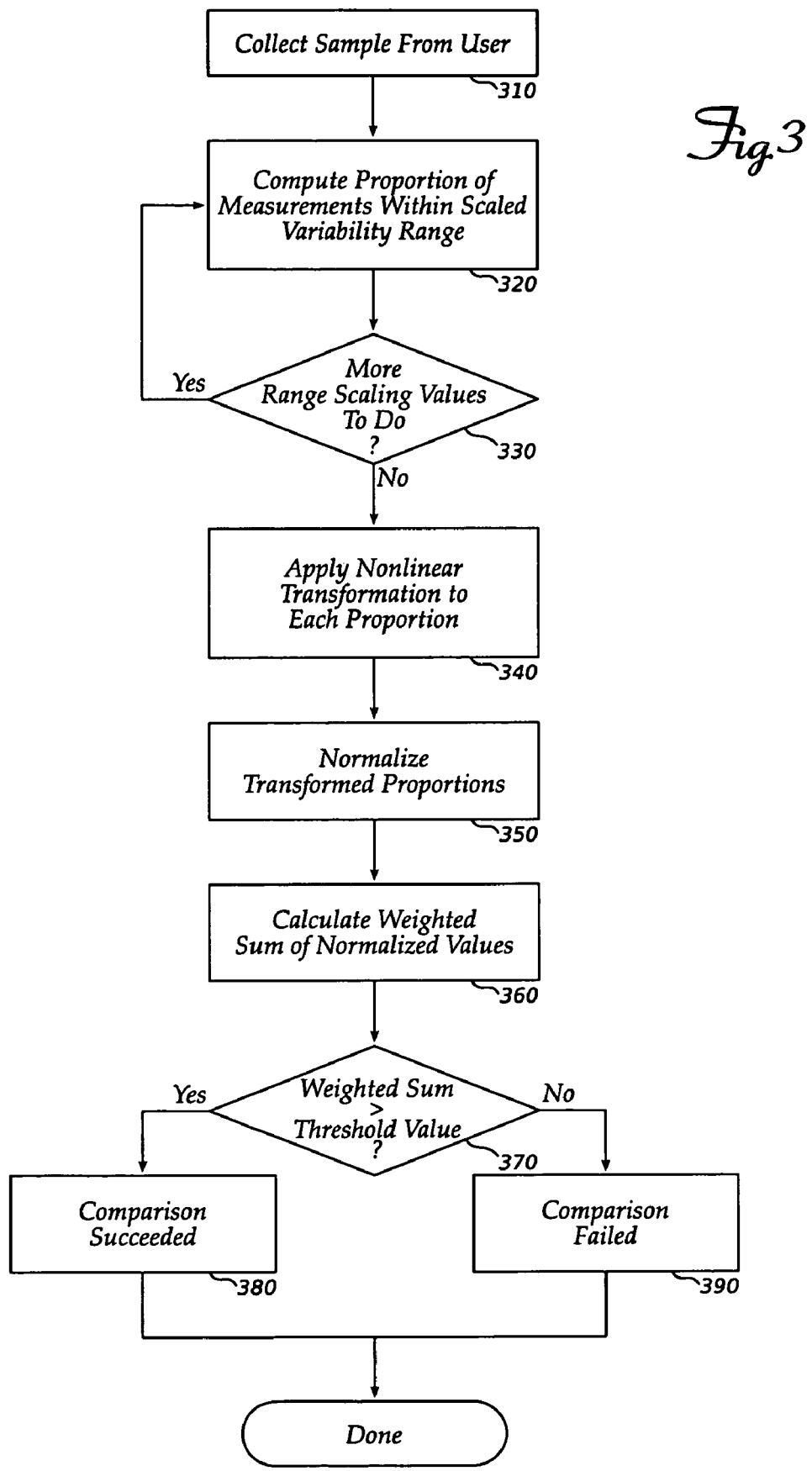
FIG. 3 is a flow chart illustrating the operation of an embodiment of the invention.

Once a template has been prepared, comparison according to an embodiment of the invention may be performed. FIG. 3 outlines the process. The embodiment contemplated with regard to this figure is a biometric authenticator using keystroke timing measurements, where a successful comparison indicates that the user who provided the sample is the same as the user whose characteristics were measured to create the template.

First, a data sample is collected from the user (310). The sample should measure the same characteristic(s) that were used to prepare the template, and for best results should be collected under conditions that are similar to those present when the enrollment or template preparation process was conducted. For example, in an embodiment that measures typing patterns, using a similar keyboard and similar timing granularity may produce a more accurate identification. The sample should have the same cardinality as the template.

Next, the sample vector elements are discretized or thresholded to determine, for each element, whether the sample element lies within a scaled variability range of the corresponding template element. A proportion of the elements that are within range is computed for each of a plurality of scaling values (320, 330). Expressing this operation in mathematical notation, we compute the elements $P_j$ of proportion vector P as:

$$P_j = \frac{\sum_{i=1}^{n} \begin{cases} 1 & \text{if } |T_i - S_i| < d_j \cdot V_i \\ 0 & \text{otherwise} \end{cases}}{n} \quad \text{(Eq. 1)}$$

where T is the template vector (see FIG. 2, 240), V is the allowable variability vector (see FIG. 2, 245), S is the sample vector, and d is a set of distance scaling factors. T, V and S are of identical cardinality n; P and d are of cardinality m. Useful values for $d_j$ have been empirically determined to be between approximately 0.5 and 2.0 while applying multi-distant scoring concepts to the keystroke dynamics field. Values less than about 0.5 inordinately restrict "permissible" variation and result in unnaturally low values of $P_j$, while values greater than about 2.0 fail to provide adequate discrimination between legitimate users and impostors. (Useful values for d depend upon the method used to enroll users and to prepare the T and V template vectors. The recited range, 0.5 to 2.0, is appropriate for typing rhythm measurements. Specific values in d may be, for example, {0.5, 1.0, 1.5, 1.7, 1.9, 2.0}.)

After P is prepared, distance-fit vector F is calculated by applying a nonlinear transformation to P (340). In one embodiment, the nonlinear transformation is a logarithm. Mathematically, $$F_j = \frac{-1}{d_j}\log(1 - P_j) \quad \text{(Eq. 2)}$$

The significance of $F_j$ is that in experiments with typing samples, it has been shown to have a relatively constant value for samples from the user whose enrollment produced the template, but not for samples from other users. In other words, when the user who provided the sample is the same as the user who created the template, values in F are uniformly high; but when the user who provided the sample is different from the user who created the template, values in F are mostly low, and not uniform. The nonlinear transformation seems to magnify differences in a useful way.

Next, the elements of F are normalized and mapped by a linear function into a convenient range (350) to create distance-scores vector D. The corresponding equation for this operation is:

$$D_j = A \cdot F_j + B \quad \text{(Eq. 3)}$$

A and B are chosen to map the elements of F to a range such as 0 to 100. If a value for $D_j$ falls outside the range, it is limited to the nearest endpoint. In the experiments with typing patterns mentioned above, values for A and B of 46.0 and −10.0, respectively, were found to be appropriate. Note that this operation merely transforms $D_j$ linearly to a more convenient range; the following operations could be performed in the untransformed range with a simple proportional adjustment to weight factors and thresholds. Values for A and B of 1 and 0, respectively, result in D being equal to F, which effectively omits the normalizing operation.

The penultimate operation is to calculate a weighted sum of the normalized distance-scores vector elements $D_j$ (360). The weight to be allotted for a given distance-score vector element can be determined through experimentation. The calculation can be expressed concisely as:

$$W = \frac{\sum_{j=1}^{m} WF_j \cdot D_j}{\sum_{j=1}^{m} WF_j} \quad \text{(Eq. 4)}$$

where WF is a vector of m weight factors. In some embodiments, it is convenient for the sum of weight factors $WF_j$ to be unity $$\left(\sum_{i=1}^{m} WF_i = 1\right).$$

In one embodiment, WF may be {0.1, 0.1, 0.2, 0.25, 0.3, 0.05}.

Finally, the weighted sum W is compared against a threshold value (370). If W is greater than the threshold, the comparison is considered to have succeeded (380); if not, it has failed (390). In some embodiments, W may be adjusted or scaled to a convenient range before comparison (scaling operation is not shown in this figure.)

A computer system can use the result of this procedure to decide whether to grant the user access to resources, services, or locations controlled by the computer.

FIG. 4 shows an alternate view of the architecture of a system according to embodiments of the invention. In this view, the process is broken into three phases: Multi-Distant Processor 400, Distance Scores Calculator 450 and Weighted Score Calculator 480. In the first phase, a sample data collection module 410 collects information about a user. Previously-prepared template data is also retrieved 420. These data to be compared are transmitted to multi-distant processor 430. Distance-scaling factors $d_j$ and weights $w_j$ from a second database 440 are also provided to the multi-distant processor 430. (The distance-scaling values and weights may be stored in the same database as the template data.)

Multi-distant processor 430 performs the first computation shown as Equation 1 and produces the proportion vector P, elements of which indicate the ratio of positive indices for each distance-scaling value. Weights W for multi-distant values 1 through m may simply be passed through to the following phases.

In the second phase, pre-scores calculator 460 determines the distance-fit scores for all the proportion values computed in the previous phase. These distance-fit scores are the elements $F_j$ of vector F as calculated according to Equation 2. The second phase passes the distance-fit scores it calculated, and the weights it received from the first phase, to the final phase.

In Phase 3 480, weighted score calculator 490 prepares a weighted sum based on the distance-fit scores and weights. It may also normalize the distant scores or adjust the weighted sum to fall within a convenient range. The possibly-normalized weighted sum is emitted as final score 499.

FIG. 5 shows some components of a computer system that can host an embodiment of the invention. System components such as main unit 510, keyboard 520 and monitor 530 form a typical foundation, while other input devices such as mouse 540, fingerprint sensor 550, finger length measuring device 560, microphone 570 (for voice recognition) and camera 580 may provide additional biometric measurements for processing through the multi-distant weighted scoring system. Main unit 510 may contain elements such as central processing unit ("CPU" or "processor") 511, memory 512, mass storage device 513, network communication interface 514 and/or device interface 515. CPU 511 may execute instructions in memory 512 to perform operations according to an embodiment of the invention. Between invocations or executions of those instructions, they may be stored on a storage medium such as mass storage device 513, or on a similar machine-readable medium.

The computer system in FIG. 5 can use an embodiment of the invention to authenticate a prospective user and grant him access to a resource upon a successful comparison. For example, the prospective user may be permitted to use the computer itself, or to access resources available through the computer (perhaps by way of the network interface 514).

An embodiment of the invention may be a machine-readable medium having stored thereon instructions which cause a processor to perform operations as described above. In other embodiments, the operations might be performed by specific hardware components that contain hardwired logic. Those operations might alternatively be performed by any combination of programmed computer components and custom hardware components.

A machine-readable medium may include any mechanism for Storing information in a form readable by a machine (e.g., a computer), including but not limited to Compact Disc Read-Only Memory (CD-ROMs), Read-Only Memory (ROMs), Random Access Memory (RAM) and Erasable programmable Read-Only Memory (EPROM).

The applications of the present invention have been described largely by reference to specific examples and in terms of particular allocations of functionality to certain hardware and/or software components. However, those of skill in the art will recognize that data comparisons according to the multi-distant weighted scoring system disclosed herein can also be produced by software and hardware that distribute the functions of embodiments of this invention differently than herein described. Such variations and implementations are understood to be captured according to the following claims.

We claim:

1. A method comprising:

collecting a vector S of n measurements of a characteristic of a user input on an input device;

computing a vector P as $$P_j = \frac{\sum_{i=1}^{n} \begin{cases} 1 & \text{if } |T_i - S_i| < d_j \cdot V_i \\ 0 & \text{otherwise} \end{cases}}{n}$$

wherein T is a vector of n template values, V is a corresponding vector of n variability values and d is a vector of m distance scaling factors;

computing a vector F as $$F_j = \frac{-1}{d_j} \log(1 - P_j)$$

computing a vector D as $$D_j = A \cdot F_j + B$$

wherein A and B are constants;

computing a scalar W as $$W = \frac{\sum_{j=1}^{m} WF_j \cdot D_j}{\sum_{j=1}^{m} WF_j}$$

wherein WF is a vector of m weight factors; and comparing the scalar W to a predetermined value to authenticate the user of the input device.

2. The method of claim 1 wherein m is 6.
3. The method of claim 1 wherein A is 1 and B is 0.
4. The method of claim 1 wherein d is {0.5, 1.0, 1.5, 1.7, 1.9, 2.0}.
5. The method of claim 1 wherein WF is {0.1, 0.1, 0.2, 0.25, 0.3, 0.05}.
6. The method of claim 1 wherein $$\sum_{i=1}^{m} WF_i = 1.$$

7. The method of claim 1 wherein the input device is coupled to a computer system and comparing the scalar W to a predetermined value authorizes the user to access the computer system.
8. The method of claim 7 wherein authorizing the user to access the computer system comprises identifying the user if the scalar W exceeds the predetermined value, and distinguishing the user as an imposter if the scalar W does not exceed the predetermined value.
9. A method comprising:
    collecting a plurality of measurements of a user input on an input device;
    computing a proportion of the plurality of measurements that fall within a scaled range of a corresponding plurality of template measurements for a plurality of scale values;
    applying a nonlinear transformation to each of the proportions;
    normalizing the transformed proportions;
    calculating a weighted sum of the normalized, transformed proportions; and
    comparing the weighted sum to a threshold value to authenticate the user of the input device.
10. The method of claim 9 wherein the plurality of measurements includes a plurality of keystroke timing values.
11. The method of claim 9 wherein the nonlinear transformation is a logarithmic transformation.
12. The method of claim 9 wherein normalizing comprises converting the transformed proportions to truncated linear scale.
13. The method of claim 9, further comprising:
    granting access to a resource if the weighted sum exceeds the threshold value.
14. A machine-readable medium containing instructions to cause a programmable logic device to perform operations comprising:
    collecting a plurality of sample measurements of a user input on an input device;
    thresholding the sample measurements against a corresponding plurality of template measurements at a plurality of scales;
    computing a proportion of successful measurements at each of the plurality of scales;
    applying a nonlinear transformation to the plurality of proportions;
    normalizing the transformed proportions;
    calculating a weighted sum of the normalized, transformed proportions; and
    comparing the weighted sum to a predetermined value to authenticate the user of the input device.
15. The machine-readable medium of claim 14, containing additional instructions to cause the programmable logic device to perform further operations, including:
    measuring at least one of a duration of a key press, a time between a key press and a subsequent key release, a time between a first key press and a second key press, or a pressure of a key press.
16. The machine-readable medium of claim 14 wherein thresholding comprises:
    comparing a sample measurement against a template measurement to determine whether the sample measurement lies within a scaled variability range of the template measurement.
17. The machine-readable medium of claim 14 wherein the nonlinear transformation is a logarithmic transformation.
18. The machine-readable medium of claim 14, containing additional instructions to cause the programmable logic device to perform further operations, including:
    granting access to a resource if the weighted sum exceeds the predetermined value.
19. The machine-readable medium of claim 14 wherein the plurality of scales comprises scaling factors between about 0.5 and about 2.0.
20. A system comprising:
    a user entry device;
    sampling logic to collect measurements from the user entry device;
    proportion logic to compute a proportion of the measurements that fall within a scaled range of corresponding measurements of a template for a plurality of scale values;
    transformation logic to apply a non-linear transformation to each of the proportions;
    normalizing logic to normalize the transformed portions;
    comparison logic to prepare a weighted sum of normalized, transformed, proportions; and
    access control logic to grant access to a resource if the weighted sum exceeds a predetermined value.
21. The system of claim 20 wherein the resource is use of the system.
22. The system of claim 20, further comprising:
    a communication interface to exchange data with a network, wherein
    the resource is data to be obtained through the network.

* * * * *